United States Patent [19]

Oestreich

[11] Patent Number: 4,907,855
[45] Date of Patent: Mar. 13, 1990

[54] MARINE CABLE FOR A FIBER OPTIC WAVEGUIDE WITH REGENERATOR SUPPLY

[75] Inventor: Ulrich Oestreich, Munich, Fed. Rep. of Germany

[73] Assignee: Siemens Aktiengesellschaft, Munich, Fed. Rep. of Germany

[21] Appl. No.: 294,861

[22] Filed: Jan. 9, 1989

[30] Foreign Application Priority Data

Jan. 15, 1988 [DE] Fed. Rep. of Germany ....... 3801409

[51] Int. Cl.$^4$ ................... B32B 9/00; G02B 6/44
[52] U.S. Cl. ...................... 350/96.23; 174/23 C
[58] Field of Search ................ 350/96.23; 174/23 C

[56] References Cited

U.S. PATENT DOCUMENTS

| 4,156,104 | 5/1979 | Mondello ................... 174/70 R |
| 4,388,485 | 6/1983 | Zeidler et al. ................ 174/23 C |

FOREIGN PATENT DOCUMENTS 2547066 6/1983 France .
2584200 6/1986 France .
2005861 5/1979 United Kingdom .
2189071 1/1987 United Kingdom .

*Primary Examiner*—Frank Gonzalez
*Attorney, Agent, or Firm*—Kenyon & Kenyon

[57] ABSTRACT

A marine cable for a fiber optic waveguide with regenerator supply. A marine cable for a fiber optic waveguide must be provided with an electrical conductor for energy supply, in order to supply energy to the regenerators. For this purpose, the optical transmission elements are surrounded by a stranded layer of metal wires with good conductivity, which serve to supply energy. The stranded layer of metal wires with good conductivity is surrounded by an insulation layer, which in turn is protected by a stranded layer of sheathing wires. Both of the stranded layers of wires are embedded in a layer of a plastic, water-repellent material. The outer casing of the cable is formed by a metal composite layer sheath. The marine cable for a fiber optic waveguide with regenerator supply line, as described, can, for example, be laid down as an intercontinental cable.

9 Claims, 1 Drawing Sheet

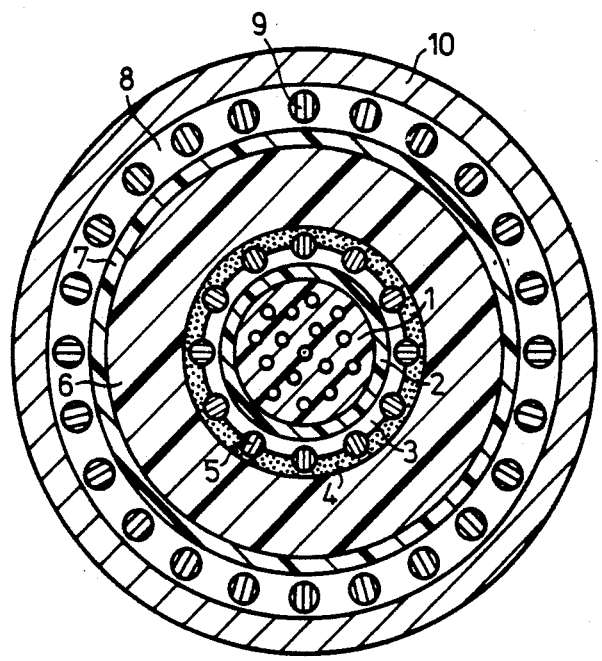

MARINE CABLE FOR A FIBER OPTIC WAVEGUIDE WITH REGENERATOR SUPPLY

BACKGROUND OF THE INVENTION

The present invention relates to an marine cable for a fiber optic waveguide with regenerator supply line, which has a central LWL-bundle-conductor wire that is surrounded by at least one stranded layer of high-tensile elements and by a watertight metal casing.

An LWL-bundle conductor, as known to those of skill in the art, is comprised of a sleeve in which several fiber optic waveguides extend longitudinally, wherein the sleeve is filled with a filler. The LWL-bundle conductor is known in the U.S. under the name "maxibundle ®", which is a trademark of SIECOR.

Such an marine cable with regenerator supply is known from U.S. Pat. No. 4,156,104. The cable described therein contains optical transmission elements in its center, which are surrounded by a stranded bond of sheathing wires. The stranded bond, in turn, is enclosed by a thick metal casing. The exterior of the cable has a thick insulating layor, which consists of two different plastic layers.

The mentioned marine cable has the disadvantage that, in the long term, the outer plastic insulation becomes damaged from the effect of moisture, and that the plastic insulation cannot prevent mechanical damage to the cable.

In French patent application FR-A-2 547 066 corresponding to U.S. Pat. No. 4,671,611), an marine cable is described that has optical waveguides running through its core, which are surrounded by a common insulating plastic layer. This cable core is surrounded by a stranded bond of steel or aluminum wires. The stranded bond is contained by a welded copper sheath. On the outside, the cable has a plastic insulation.

This cable, known from the French application, has, on its exterior, only a very vulnerable plastic insulation. The danger exists, that the moisture can penetrate through to the copper sheath. Since the stranded bond touches the copper sheath, an insulation of the cable core, in this case, is no longer provided.

British patent application No. GB-A-2 189 071 describes a marine cable, whereby a compressible medium, for example foam or silicon, is added between the individual stranded bonds of the sheathing wires. The purpose of this is to prevent any harm to the cable when it is unrolled.

This cable is not provided with a protective metal sheath. This is necessary, however, especially to protect against penetrating moisture. Once the outer plastic layer of the cable has been damaged, the outer stranded bond of the sheathing wires is exposed to an ingression of water.

In British patent application No. GB-A-2 005 861, an marine cable is also described with integrated optical transmission elements. The essential disadvantage of the marine cable in this British application is that its thick plastic insulation on the outside is very vulnerable, and if any damage occurs, it no longer guarantees an insulation of the cable core.

SUMMARY OF THE INVENTION

An object of the present invention is to provide an marine cable for a fiber optic waveguide that bypasses the mentioned disadvantages and is technically easy and cost-effective to manufacture.

The above and other objects of the invention are achieved by a marine cable for a fiber optic waveguide with a regenerator supply line, which has a central LWL-bundle-conductor i.e. a straight jelly filled loose tube wire that is surrounded by at least one stranded layer of high-tensile elements and by a watertight metal casing, wherein the marine cable features, inside the outer stranded layer of high-tensile sheathing wires, an inner SZ-stranded layer of metal wires with good conductivity, which is embedded in a layer of a plastic, water-repellent material or between two layers of different plastic, water-repellent materials, whereby the specific electrical resistance of the embedding materials is smaller by at least one order of magnitude than that of an insulation layer, which separates the two stranded layers from each other.

The advantage of this embodiment of the invention lies in the fact that, on the one hand, as a result of the embedding of the sheathing wires in water-repellent materials, marine water is prevented from penetrating and spreading inside the cable. The fact that the specific electrical resistance of the embedding materials is smaller by at least one order of magnitude than that of the insulation layer, causes, on the other hand, a filtering of the conductor inside the cable, which increases the electrical-insulation value. The SZ-stranded bond of metal wires with good conductivity can consist, for example, of copper wires.

One embodiment of the invention provides that the inner stranded bond of metal wires with good conductivity and/or the outer stranded bond of sheathing wires be embedded in a layer of polyisobutylene.

The choice of polyisobutylene as an embedding material is advantageous, in so far as polyisobutylene is chemically stable, as well as extremely permanent, and it adheres well. In addition, polyisobutylene is self-healing in case of leakages.

Another embodiment of the invention provides that the inner stranded bond of wires with good conductivity be embedded between two layers, each made of water-repellent plastic material, of which the layer in the cable design that lies further inside consists of polyisobutylene and the layer that lies more to the outside is made of an adhesive which fuses with a subsequently applied insulation layer.

The use of a such an adhesive on the exterior of the inner stranded bond enables a good and lasting connection with the insulation layer, which has been extruded on in a warmed-up state.

Another embodiment of the invention provides that the central LWL-bundle-conductor wire be filled with a filling material, which is a standard filler in ground cables, and surrounded by a bundle tubing, which consists of a high-strength non-crystallizing material, especially of a polyamide, a polyetherimide or a polycarbonate.

Manufacturing the bundle tubing for the LWL-bundle-conductor wire, out of one of the mentioned materials, assures a good mechanical and temperature-resistant protection for the bundle-conductor wire.

Another preferred embodiment of the invention provides that the insulation layer, which in the cable design lies between the inner and the outer stranded bond, be surrounded by a layer of polyamide 12.

The protective layer of polyamide 12 essentially serves to protect the insulation layer from damage caused by the sheathing wires.

Another embodiment of the invention provides that the marine cable have a metal composite-layer sheath as its outer casing.

The metal composite-layer sheath protects the marine cable, on the one hand, from the ingression of marine water and, on the other hand, provides a good mechanical protection also against sharks. It can be designed as a composite-layer sheath made of aluminum, steel or copper.

A method to manufacture the LWL-marine cable, according to the invention, can be developed in a way that enables the following steps to be combined into one sequence of operation:

Manufacture of the central LWL-bundle-conductor wire with the bundle tubing,

Application of a SZ-stranded bond of metal wires with good conductivity, which are embedded in a layer of plastic, water-repellent material, Extruding on the insulation layer, Application of a protective layer of PA 12 on the insulation layer.

The advantage of combining the described process steps into one single process lies in the fact that the manufacture and processing of the product up to this stage can ensue very cost-effectively and in a timesaving manner, since the winding and stacking procedures, which are usually carried out between the process steps, can be eliminated. The intermediate product in question already possesses a sufficient tensile strength, as a result of the stranded bond of metal wires with good conductivity that it contains, so that it can be processed relatively problem-free in the subsequent manufacturing process.

BRIEF DESCRIPTION OF THE DRAWING

The single drawing FIGURE illustrates one embodiment of the LWL marine cable with regenerator supply in a crosssection.

DETAILED DESCRIPTION

The central LWL-buddle-conductor wire 1 is surrounded by a bundle tubing 2, that consists of PAT12. This material is especially resistant to mechanical loads and high temperatures. As an embedded mass 3, a layer of polyisobutylene is applied to the bundle tubing. Stranded copper wires 5 are placed in this layer. The copper wires 5 are covered on the outside with a layer of adhesive 4 which fuses with an insulation layer 6. The insulation layer 6 is extruded on to the adhesive 4. This insulation layer 6 is surrounded on the outside by a protective layer 7 of PA12. Outside of this protective layer 7, exterior sheathing wires 9 are arranged, which are placed in an embedding mass 8 of polyisobutylene. An aluminum composite-layer sheath 10 is permanently bonded, so that it is impermeable to water, around the sheathing wires 9 with the mass 8, in which they are embedded.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A marine cable for a fiber optic waveguide with a regenerator supply line, the marine cable having a central LWL-bundle-conductor wire that is surrounded by at least one stranded layer of high-tensile sheathing wires and by a watertight metal casing, wherein the marine cable further comprises, within the stranded layer of high-tensile sheathing wires, an inner SZ-stranded layer of high-tensile sheathing wires, an inner SZ-stranded layer of eonduction embedded in a plastic, water-repellent embedding material, an insulation layer being disposed between the inner stranded layer and the sheathing wires, the embedding material having a specific electrical resistance smaller by at least one order of magnitude than that of the insulation layer.

2. The marine cable recited in claim 1, wherein at least one of the inner stranded layer of conductive metal wires and the stranded layer of sheathing wires is embedded in a layer of polyisobutylene.

3. The marine cable recited in claim 1, wherein the embedding material comprises to layers of different plastic water-repellent materials and the inner stranded layer of conductive wires is embedded between said two layers.

4. The marine cable recited in claim 1, wherein the central bundle-conductor wire is surrounded by a filling material, and by a bundle tubing which comprises a high-strength, non-crystallizing injection molding material.

5. The marine cable recited in claim 1, wherein the insulation layer disposed between the inner stranded layer and the sheathing layer is surrounded by a layer of polyamide.

6. The marine cable recited in claim 1 wherein the marine cable comprises a metal composite-layer sheath as an outer casing.

7. The marine cable recited in claim 3, wherein said two layers comprise an inner layer and an outer layer, the inner layer comprising polyisobutylene and the outer layer comprising an adhesive which fuses with said insulation layer.

8. The marine cable recited in claim 4, wherein said injection molding material comprises one of a polyamide, a polyetherimide or a polycarbonate.

9. A method for the manufacture of a marine cable for a fiber optic waveguide with a regenerator supply line, the marine cable having a central LWL-bundle-conductor wire surrounded by at least one stranded layer of high-tensile sheathing wires and by a watertight metal casing, wherein the marine cable further comprises, within the stranded layer of high-tensile sheathing wires, an inner SZ-stranded layer of conductive metal wires embedded in a plastic, water-repellent embedding material, an insulation layer being disposed between the inner stranded layer and the sheathing wires, the embedding material having a specific electrical resistance smaller by at least one order of magnitude than that of the insulation layer, the method comprising the steps of:

surrounding the central LWL-bundle-conductor wire with a bundle tubing;

applying the SZ-stranded layer of conductive metal wires to the bundle tubing, and further embedding said SZ-stranded layer in said plastic, water-repellent embedding material;

extruding the insulation layer on said plastic, water repellent embedding applying a protective layer of PA 12 to the insulation layer.

* * * * *